United States Patent [19]

Petersen et al.

[11] Patent Number: 5,585,556
[45] Date of Patent: Dec. 17, 1996

[54] METHOD AND APPARATUS FOR PERFORMING MEASUREMENTS WHILE DRILLING FOR OIL AND GAS

[75] Inventors: Steen A. Petersen, Bergen; Rune Heggernes, Sæbøvågen, both of Norway

[73] Assignee: Norsk Hydro a.s., Oslo, Norway

[21] Appl. No.: 567,426

[22] Filed: Dec. 5, 1995

[30] Foreign Application Priority Data

Dec. 5, 1994 [NO] Norway ............................. 944694

[51] Int. Cl.$^6$ ............................. E21B 47/00; G01V 1/00
[52] U.S. Cl. .................... 73/152.03; 73/594; 73/606; 73/152.15; 73/152.47; 166/250.16; 166/255.1; 367/40
[58] Field of Search ..................... 73/151, 152, 153, 73/594, 606; 166/66, 250.01, 250.16, 255.1; 367/14, 25, 27, 33, 40, 41, 42, 86

[56] References Cited

U.S. PATENT DOCUMENTS

| | | | |
|---|---|---|---|
| 2,203,272 | 6/1940 | Sparks ............................. | 367/86 |
| 2,557,714 | 6/1951 | Williams ............................. | 367/42 |
| 3,530,430 | 9/1970 | Embree ............................. | 367/40 |
| 3,876,016 | 4/1975 | Stinson ............................. | 166/255.1 |
| 4,003,017 | 1/1977 | Bailey ............................. | 367/86 |
| 4,718,048 | 1/1988 | Staron et al. ............................. | 367/40 |
| 4,945,987 | 8/1990 | Wittrisch ............................. | 166/250 |
| 5,016,727 | 5/1991 | Wittrisch ............................. | 166/250.16 |
| 5,050,130 | 9/1991 | Rector et al. ............................. | 367/41 |
| 5,096,001 | 3/1992 | Buytaert et al. ............................. | 175/40 |
| 5,130,949 | 7/1992 | Kan et al. ............................. | 367/27 |
| 5,303,203 | 4/1994 | Kingman ............................. | 367/75 |
| 5,309,404 | 5/1994 | Kostek et al. ............................. | 367/31 |

FOREIGN PATENT DOCUMENTS

| | | | |
|---|---|---|---|
| 0479543 | 4/1992 | European Pat. Off. . | |
| 1385114A | 3/1988 | U.S.S.R. ............................. | 367/27 |

*Primary Examiner*—Richard Chilcot
*Assistant Examiner*—George M. Dombroske
*Attorney, Agent, or Firm*—Wenderoth, Lind & Ponack

[57] ABSTRACT

A method and equipment are described for performing measurements while drilling for oil or gas, in particular VSP-measurements employing a seismic source together with sensors such as hydrophones and/or geophones connected to a memory- and calculation device for storing and processing the seismic signals. The seismic source (2) is placed at or in the vicinity of the surface of the earth whereby signals generated by the source are detected by the hydrophones (3,5) or the geophones located in the vicinity of the source (2) at the surface and in the drill string (4). The geophones or the hydrophones (5) in the drill string transmit the detected signals to a memory- and calculation unit (6) in the drill string that processes and transmits the signals completely or partly to a central data processing unit (10) on the rig (7). The hydrophones or the geophones (3) at the surface simultaneously transmit the detected signals to the central data processing unit at the surface, while chronometers (8,9) showing identical times, connected to the source and to the memory- and calculation device in the drill string make possible a precise calculation of the travel time of the seismic signal between the source (2) and the geophones or the hydrophones in the drill string.

8 Claims, 2 Drawing Sheets

Concept for VSP-MWD
Two chronometers option (at geophone/hydrophone)

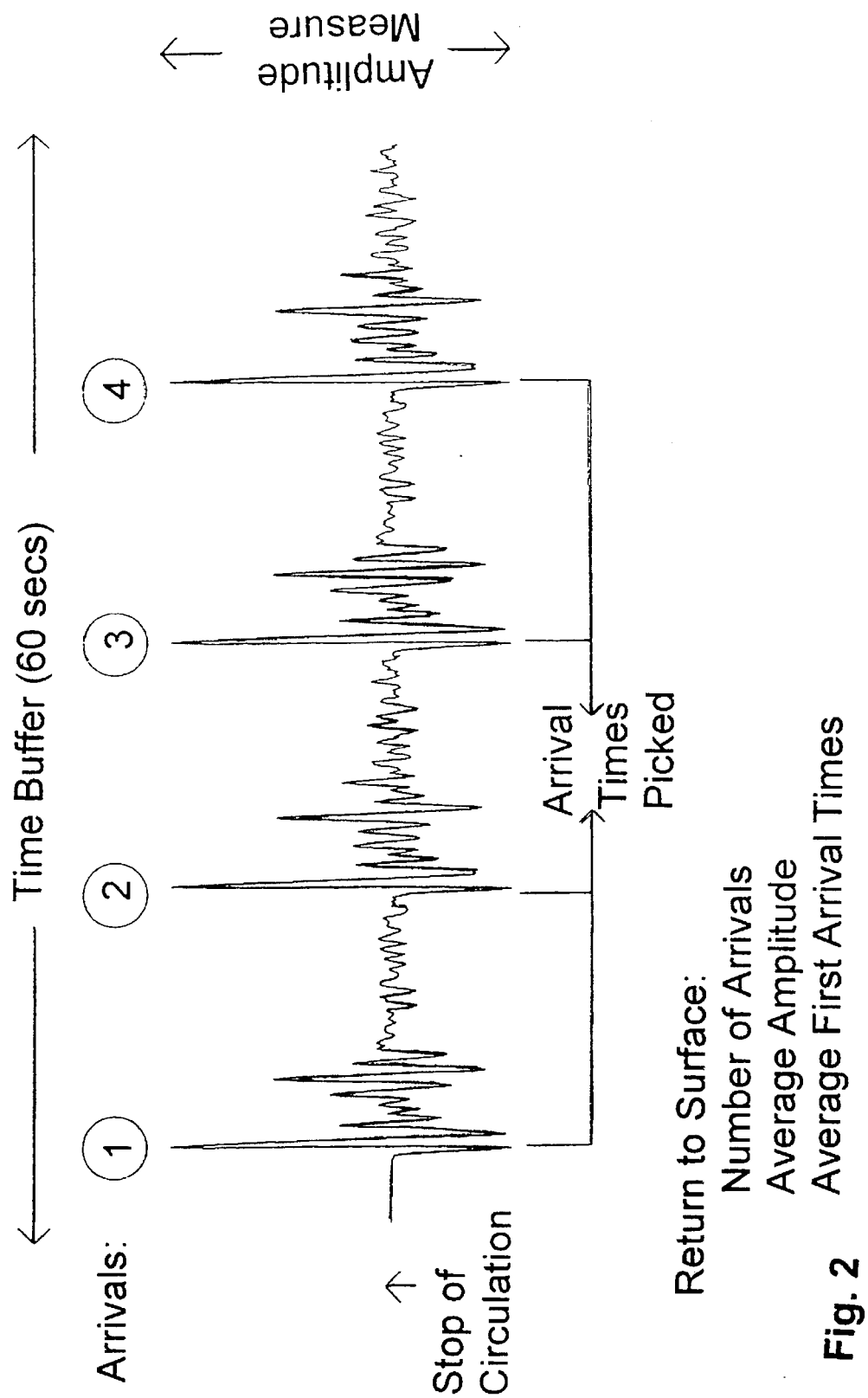
Fig. 2  Downhole Processing of Seismic Signals

METHOD AND APPARATUS FOR PERFORMING MEASUREMENTS WHILE DRILLING FOR OIL AND GAS

BACKGROUND OF THE INVENTION

The present invention relates to a method and apparatus for performing measurements while drilling for oil and gas in formations beneath the earth's surface, particularly Vertical Seismic Profiling (VSP)-measurements involving the use of a seismic source and sensors, together with a memory and calculation device for storing and processing the received seismic signals.

When extracting oil and gas from formations beneath the earth's surface/sea bed, measurements are performed in wells that are drilled in order to obtain information such as the position of the bit, oil/gas composition/quality, pressure, temperature and other geophysical and geological conditions.

Commonly, well measurements are performed in four phases; 1) when performing drilling operations (MWD—Measurements While Drilling), 2) when logging after the drilling operations have been completed 3) during completion of the well 4) in the production phase.

MWD has primarily been introduced as an aid for direction control when drilling (by position measurements), but gradually this method has also replaced the logging phase.

Furthermore, MWD appears to be the only way of collecting logging information in extended reach wells and in horizontal wells. The application of the MWD equipment has resulted in a reduction of logging costs and it has made it possible to take measurements at locations not previously accessible.

Seismic measurements such as VSP (Vertical Seismic Profiling) have commonly been performed during the logging phase, but measurements of this type have also been employed during the completion phase and the production phase of the wells.

For a long time, there has been a demand for performing VSP-measurements in the drilling phase, referred to as MWD-VSP, as it is assumed that this will reduce costs, but the equipment necessary for performing such measurements has not been available until now.

VSP-measurements are in particular employed to determine the vertical travel time through the ground in a frequency band that is characteristic for seismic records taken at the surface of the earth. By these means, detailed measurements performed in the well may be intergrated with seismic measurements performed at the surface of the earth. In VSP-measurements, the source will be located close to the surface or in the well, with corresponding sensors in the well or close to the surface. Today, data from VSP-measurements are collected by means of a source located close to the sea surface, and with the recording system connected to the logging cable. The geometry of the VSP-measurements may further be used for recording reflected signals that are weak, and that represent structural surface elements such as stratigraphic borders/fault planes in the close (max. one km.) vicinity of the well (primarily under, but also to the side of and above the well). MWD-VSP is equivalent to a VSP logged in the traditional manner, and may at the same time be used as an aid for direction/position control when performing the drilling operation.

There is a previously known method based upon "passive" source MWD-VSP where the drill bit serves as the source, and where the recording equipment is placed on the sea bed.

This method is somewhat dated, and today it still represents the sole method developed for industrial applications. The method was marketed as a successor to traditional VSP on its introduction 1988, but it has proved to be encumbered with so many substantial limitations that little data has been collected under operational conditions that characterise drilling in the North Sea. The companies that invented the method point out that the most essential condition for generating signals that are sufficiently strong, is to use drill bits of the "roller cone" type. Thus, the method is not considered to be of current interest for use in conjunction with other types of drill bits, and therefore most of the delineation and production wells in the North Sea cannot be served by this method. The signal transmitted and the time of first arrival are often partly degraded to a relative accuracy of 5 msec and to an absolute accuracy of approximately 10 msec. These uncertainties are not acceptable when performing measurements in delineation and production wells. The examples given by contractors relating to the use of the reflected signals, have not been considered as usable, and the details in the reflected signals that are critical in a drilling operation and in the interpretation of the surface seismic after the drilling operation has been completed are at a level substantially below the noise level present in the records.

The disadvantages characterized by the passive source method mentioned above, may be avoided by making the source strong and controllable. Among other things, there have been suggestions to apply sources driven by the circulating drilling mud. Also, tests of the use of a telemetry pulser as a source have been performed. Further, tests have been performed employing special sources that are stronger than the telemetry pulser. Meanwhile, it is uncertain whether such a source will be harmful to the well and whether the energy level in the mud will be sufficient for driving more powerful sources while still meeting the demand for the energy needed in the drilling operation.

SUMMARY OF THE INVENTION

The present invention provides a method and a design of equipment for performing seismic measurements (MWD-VSP measurements) during drilling operations, where the above-mentioned disadvantages are completely or at least substantially eliminated. Thus, a solution is hereby proposed that offers the possibility of performing measurements in extended wells and horizontal wells, and of utilizing the VSP-measurements in an active manner as a direction control device during drilling operations. These two applications, and the fact that logging after the drilling operation has been completed is now redundant, will lead to substantial cost reductions when drilling for oil or gas.

Furthermore, an extended use of the calculation unit in the drill string will lead to an optimal utilization of the communication possibilities between the drill string and the rig.

According to the invention, the method is characterized in that the seismic source is placed at the surface of the earth, or in the close vicinity thereof, and that the signals generated are detected by hydrophones or geophones that are located close to the source at the surface and in the drill string. Further, the geophones or hydrophones in the drill string deliver the detected signals to a memory and calculation unit in the drill string that processes the signals and transmits them completely or partly to a central data processing unit at the surface, and simultaneously, the hydrophones or the geophones at the surface transmit the detected signals to the central data-processing unit at the surface, while chronometers that show identical times are connected to the source and to the memory and calculation unit in the drill string. The chronometers enable a precise calculation of the travel time for the seismic signals between the source and the geophones or the hydrophones in the drill string.

BRIEF DESCRIPTION OF THE DRAWINGS

In the following, the invention is described in detail with reference to drawings that illustrate an embodiment thereof, wherein:

FIG. 2 shows an example of signals as they will be registered in the implementation of the method.

DETAILED DESCRIPTION OF THE PREFERRED EMBODIMENT

Figure 1:
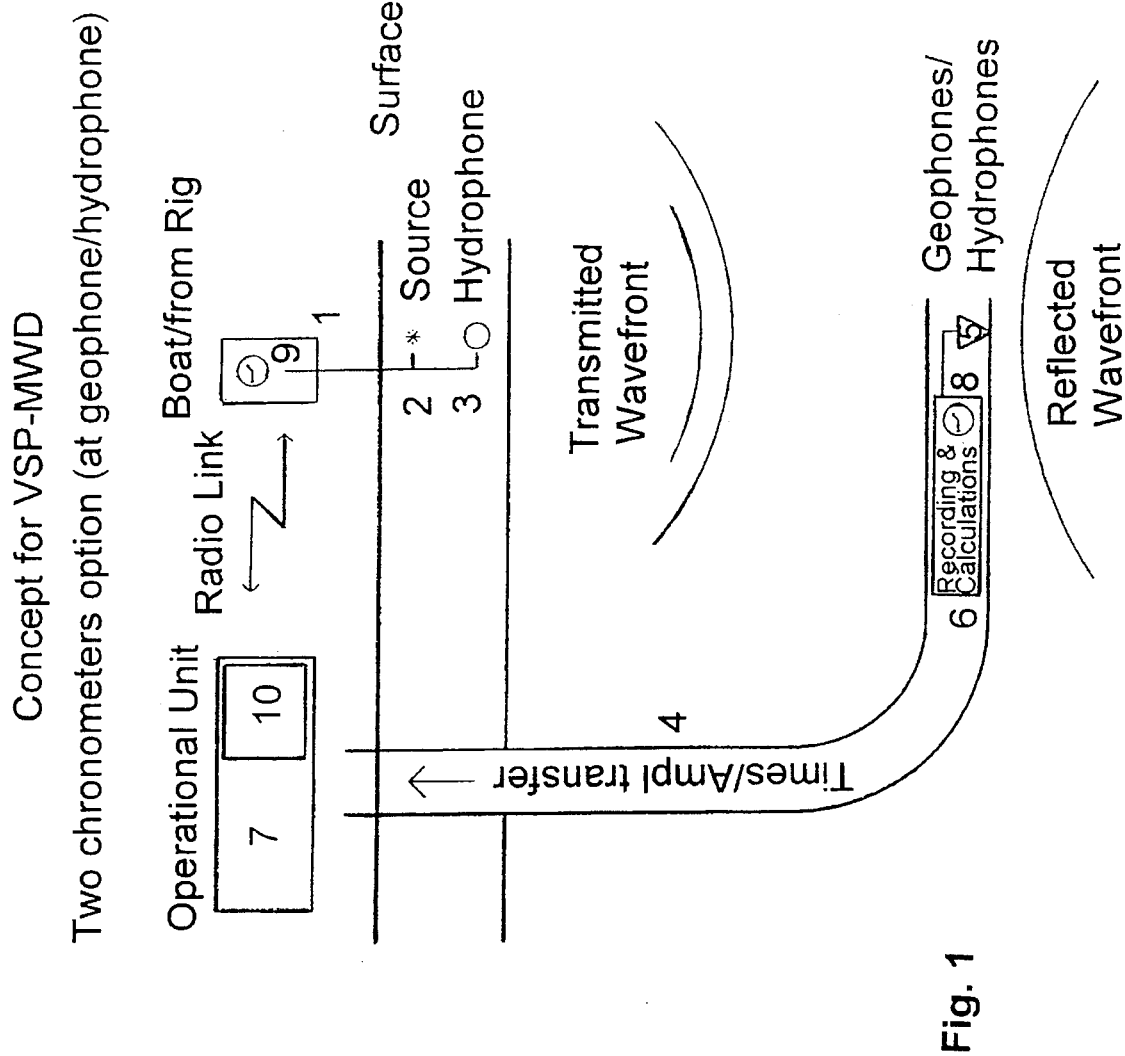
FIG. 1 shows the principles of the method and the equipment according to the invention.

The use of the method and the equipment is based upon the application of a seismic source 2 located at or in the vicinity of the surface of the earth, the source being controllable from a rig 7 or a ship 1. The use further implies one or more sensors such as a hydrophone 3 or the like, located close to the source 2 and controllable from the rig 7. Sensors such as geophones or hydrophones 5 together with a memory and calculation unit 6 is embedded in the drill string. The programs used in the memory and calculation unit are designed to process the signals that are received by electrical cables from the seismic sensors 5 or other registration units or sondes for the measurement of temperature, pressure, or the like.

In the memory and calculation unit 6 in the drill string, all data registered during the drilling operation are stored. Only the data that are needed immediately, e.g. acoustical data to determine the position of the drill head, will be transmitted through the drill string 4 to a central data processing unit on the rig 7 at the surface. Signals received from the sensors 3 near the source 2 will simultaneously be transmitted from the rig/ship 1 by radio/telemetry to the central data processing unit 10 on the drilling platform. All the other signals that are recorded in the memory and calculation unit 6 in the drill string, and that are of no immediate interest, will be transmitted to the central unit as the drill string is withdrawn.

Elements of great importance in the equipment according to the present invention are the use of chronometers 8 and 9 in connection with the memory and calculation unit 6 in the drill string 4 and the central data processing unit on the rig 7. These chronometers and synchronized so as to show identical times with a deviation of ±1 millisecond or less. When using such chronometers in connection with the equipment as described above, the following will be achieved:

1. Two-way measurements of the travel time (TWT) and measurements of the acoustic impedance for the stratum in which the drill string with its sensors 5 is located, and immediate transmission of the signals.

2. The memory unit 6 that contains traditional VSP-data, may be emptied at each withdrawal of the drill string, and processing the data for localization of reflecting planes may be rapidly performed after the drilling operation has been terminated.

Seismic measurements during the drilling operation according to the invention will be performed as follows:

The circulation of the drilling fluid is interrupted as the sensors 5 in the drill string are activated for the registration of sound signals discharged from the seismic source 2.

In the following 60–120 seconds (according to FIG. 2) the memory and calculation unit 6 will acquire all signals from the sensors in the drill string. FIG. 2 shows signals registered by a sensor after the discharge of four shots from the seismic source. The signals contain both the transmitted and the reflected waveforms. The sources must be discharged within a fixed interval of time. After this time interval, the content of the memory unit is copied to the calculation unit and is processed to determine the number of shots, the mean arrival time, and the mean amplitude of the first arrived signals. This information may be returned to the surface while the drilling fluid is put into circulation again.

We claim:

1. A method of performing measurements while drilling for oil or gas, the method comprising:

generating signals by a seismic source positioned near the surface of the earth;

detecting the signals generated by the seismic source with sensors located in the vicinity of the seismic source and with sensors located in a drill string;

transmitting the signals, detected by the sensors in the drill string, to a memory and calculation device located in the drill string;

processing the detected signals and transmitting the processed signals in whole or in part to a central data processing unit located at the earth's surface;

transmitting the signals, detected by the sensors located at the surface, to the central data processing unit simultaneously with the transmission of the processed signals; and calculating travel time of the seismic signals between the seismic source and the sensors in the drill string using a first chronometer operably connected to the seismic source and a second chronometer operably connected to the memory and calculation device located in the drill string, wherein the first and second chronometers are synchronized.

2. The method as claimed in claim 1, wherein the seismic sensors are geophones.

3. The method as claimed in claim 1, wherein the seismic sensors are hydrophones.

4. The method as claimed in claim 1, wherein the measurements are vertical seismic profiling measurements.

5. Apparatus for performing measurements while drilling for oil or gas, said apparatus comprising:

a seismic source;

first sensors positioned near said source;

second sensors, positionable in a drill string, for detecting signals from said source;

a memory and calculation device positionable in a drill string and operably connected to said second sensors for processing and transmitting signals from said second sensors;

a central data processing unit for receiving all or part of the signals processed by said memory and calculation device, and for simultaneously receiving signals transmitted from said first sensors;

a first chronometer connected to said seismic source; and a second chronometer connected to said memory and calculation device, wherein said first and second chronometers are synchronized and facilitate a precise calculation of the travel time of a seismic signal from said source to said second sensors.

6. The apparatus as claimed in claim 5, wherein said first and second sensors are geophones.

7. The apparatus as claimed in claim 5, wherein said first and second sensors are hydrophones.

8. The apparatus as claimed in claim 5, wherein one of said first and second sensors are geophones and the other of said first and second sensors are hydrophones.

* * * * *